United States Patent
Ueda

(10) Patent No.: US 8,878,479 B2
(45) Date of Patent: Nov. 4, 2014

(54) MOTOR CONTROL DEVICE

(75) Inventor: Koichiro Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 13/639,281

(22) PCT Filed: May 10, 2011

(86) PCT No.: PCT/JP2011/060740
§ 371 (c)(1),
(2), (4) Date: Oct. 4, 2012

(87) PCT Pub. No.: WO2011/145476
PCT Pub. Date: Nov. 24, 2011

(65) Prior Publication Data
US 2013/0033220 A1    Feb. 7, 2013

(30) Foreign Application Priority Data
May 18, 2010 (JP) ................. 2010-114206

(51) Int. Cl.
G01C 19/30 (2006.01)
(52) U.S. Cl.
USPC ........... 318/689; 318/560; 318/561; 318/609; 318/610
(58) Field of Classification Search
USPC ............ 318/689, 560, 561, 609, 610, 689.56
See application file for complete search history.

(56) References Cited

U.S. PATENT DOCUMENTS

| | | | | |
|---|---|---|---|---|
| 4,828,473 A | * | 5/1989 | Otake et al. | 425/145 |
| 5,562,525 A | * | 10/1996 | Mori et al. | 451/5 |
| 5,569,060 A | * | 10/1996 | Mori et al. | 451/5 |
| 5,637,969 A | * | 6/1997 | Kato et al. | 318/432 |
| 5,650,704 A | * | 7/1997 | Pratt et al. | 318/623 |
| 6,936,990 B2 | * | 8/2005 | Oyama et al. | 318/632 |
| 6,994,537 B2 | * | 2/2006 | Liu et al. | 425/143 |
| 7,331,208 B2 | * | 2/2008 | Fujibayashi et al. | 72/454 |
| 7,344,664 B2 | * | 3/2008 | Kamiguchi et al. | 264/40.5 |
| 7,462,025 B2 | * | 12/2008 | Uchiyama et al. | 425/143 |
| 7,739,894 B2 | * | 6/2010 | Suzuki | 72/454 |

(Continued)

FOREIGN PATENT DOCUMENTS

| | | |
|---|---|---|
| JP | 2006 255743 | 9/2006 |
| JP | 2008 181452 | 8/2008 |

OTHER PUBLICATIONS

U.S. Appl. No. 13/699,343, filed Nov. 21, 2012, Ueda, et al.

(Continued)

*Primary Examiner* — Paul Ip
(74) *Attorney, Agent, or Firm* — Oblon, Spivak, McClelland, Maier & Neustadt, L.L.P.

(57) ABSTRACT

A motor control device main unit includes a pressure command signal generation module, a pressure control module, a speed control module, and a current control module. The pressure command signal generation module of the motor control device main unit generates a pressure command value so that a derivative of the pressure command value is equal to or less than a product of an elastic constant of the pressurized target and a maximum motor speed. The pressure control module carries out pressure control calculation to calculate a motor speed command value based on a deviation between the pressure command value and an actual pressure value, and generates a motor speed command signal, which is a signal of the motor speed command value.

5 Claims, 7 Drawing Sheets

(56) References Cited

U.S. PATENT DOCUMENTS

| | | | |
|---|---|---|---|
| 7,757,526 B2* | 7/2010 | Iwashita et al. | 72/21.4 |
| 7,824,164 B2* | 11/2010 | Hakoda et al. | 425/145 |
| 7,845,205 B2* | 12/2010 | Iwashita et al. | 72/454 |
| 7,904,196 B2* | 3/2011 | Okazaki | 700/203 |
| 8,037,735 B2* | 10/2011 | Kohno et al. | 72/453.13 |
| 8,042,375 B2* | 10/2011 | Suzuki | 72/453.13 |
| 8,089,226 B2* | 1/2012 | Matsutani et al. | 318/68 |
| 8,119,044 B1* | 2/2012 | Akasaka | 264/40.7 |
| 8,222,851 B2* | 7/2012 | Tajima et al. | 318/619 |
| 8,229,592 B2* | 7/2012 | Akasaka | 700/200 |
| 8,508,171 B2* | 8/2013 | Miyaji | 318/560 |
| 2003/0062643 A1* | 4/2003 | Bulgrin et al. | 264/40.1 |
| 2003/0184251 A1* | 10/2003 | Oyama et al. | 318/607 |
| 2004/0119183 A1* | 6/2004 | Liu et al. | 264/40.5 |
| 2005/0206025 A1* | 9/2005 | Kamiguchi et al. | 264/40.5 |
| 2006/0012326 A1* | 1/2006 | Iwashita et al. | 318/645 |
| 2006/0145379 A1* | 7/2006 | Okazaki | 264/40.1 |
| 2006/0276927 A1* | 12/2006 | Uchiyama et al. | 700/203 |
| 2007/0084264 A1* | 4/2007 | Iwashita et al. | 72/350 |
| 2008/0066515 A1* | 3/2008 | Iwashita et al. | 72/351 |
| 2009/0078016 A1* | 3/2009 | Suzuki | 72/20.1 |
| 2009/0087510 A1* | 4/2009 | Hakoda et al. | 425/149 |
| 2009/0126453 A1* | 5/2009 | Suzuki | 72/453.13 |
| 2010/0039053 A1* | 2/2010 | Matsutani et al. | 318/68 |
| 2010/0052594 A1* | 3/2010 | Tajima et al. | 318/619 |
| 2011/0298146 A1* | 12/2011 | Akasaka | 264/40.3 |
| 2012/0001582 A1* | 1/2012 | Park | 318/610 |
| 2012/0104642 A1* | 5/2012 | Akasaka | 264/40.3 |
| 2012/0194121 A1* | 8/2012 | Miyaji | 318/615 |
| 2013/0147078 A1* | 6/2013 | Matsubayashi et al. | 264/40.3 |

OTHER PUBLICATIONS

International Search Report Issued Aug. 16, 2011 in PCT/JP11/60740 Filed May 10, 2011.

U.S. Appl. No. 13/639,631, filed Oct. 5, 2012, Ueda, et al.

* cited by examiner

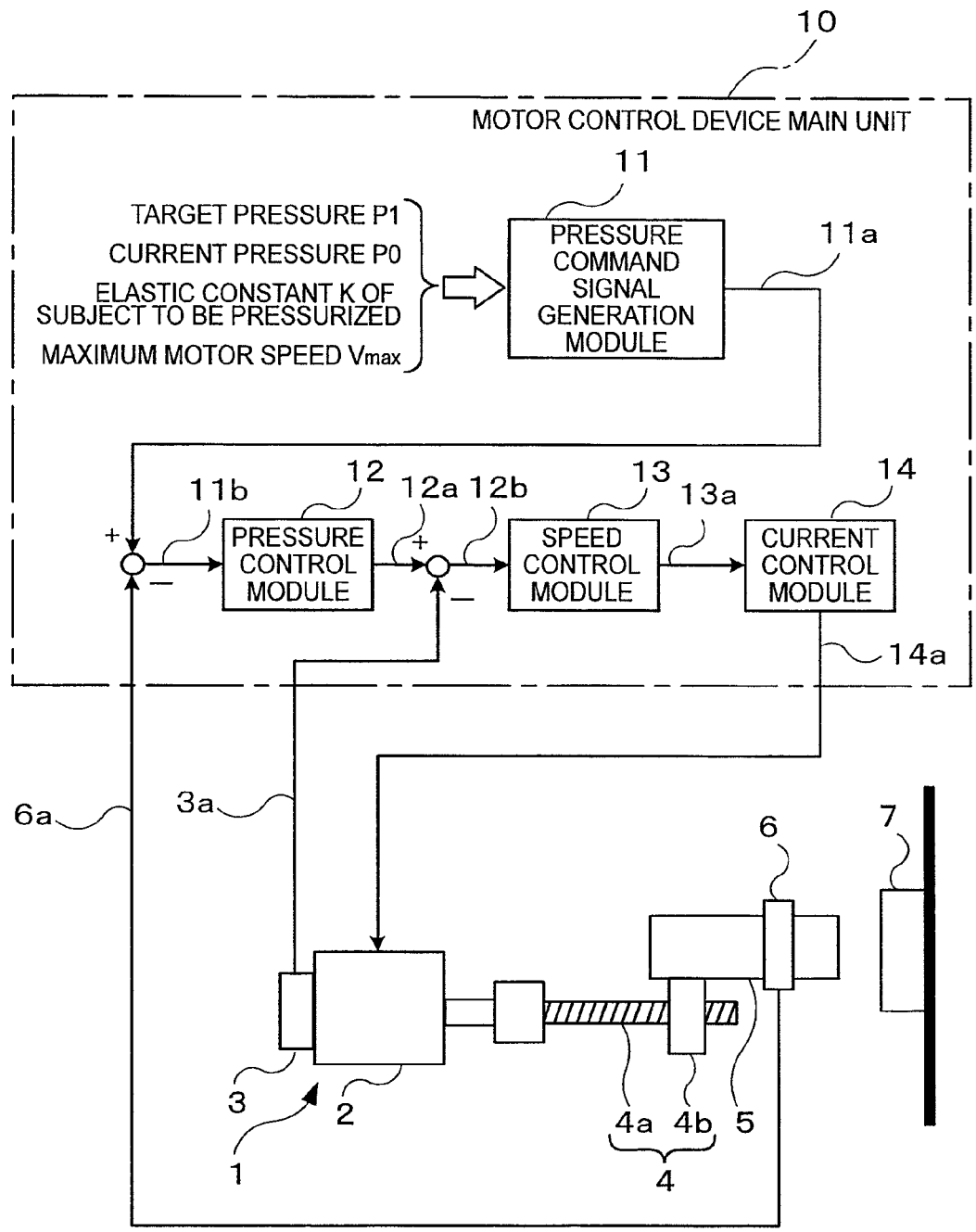

FIG. 2

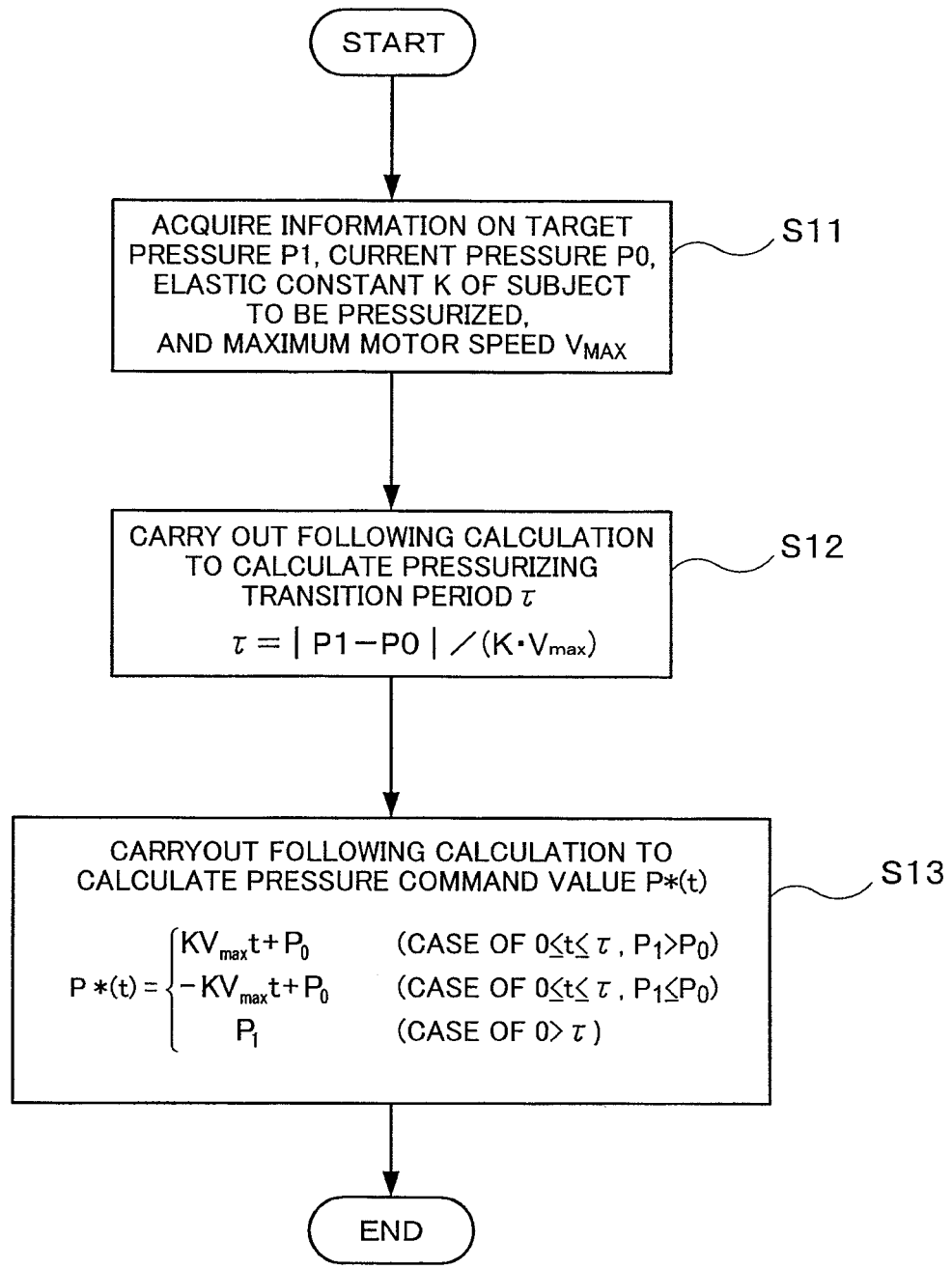

START
↓
ACQUIRE INFORMATION ON TARGET PRESSURE P1, CURRENT PRESSURE P0, ELASTIC CONSTANT K OF SUBJECT TO BE PRESSURIZED, AND MAXIMUM MOTOR SPEED $V_{MAX}$ — S11
↓
CARRY OUT FOLLOWING CALCULATION TO CALCULATE PRESSURIZING TRANSITION PERIOD $\tau$ — S12

$$\tau = |P1 - P0| / (K \cdot V_{max})$$

↓
CARRYOUT FOLLOWING CALCULATION TO CALCULATE PRESSURE COMMAND VALUE $P*(t)$ — S13

$$P*(t) = \begin{cases} KV_{max}t + P_0 & (\text{CASE OF } 0 \leq t \leq \tau, P_1 > P_0) \\ -KV_{max}t + P_0 & (\text{CASE OF } 0 \leq t \leq \tau, P_1 \leq P_0) \\ P_1 & (\text{CASE OF } 0 > \tau) \end{cases}$$

↓
END

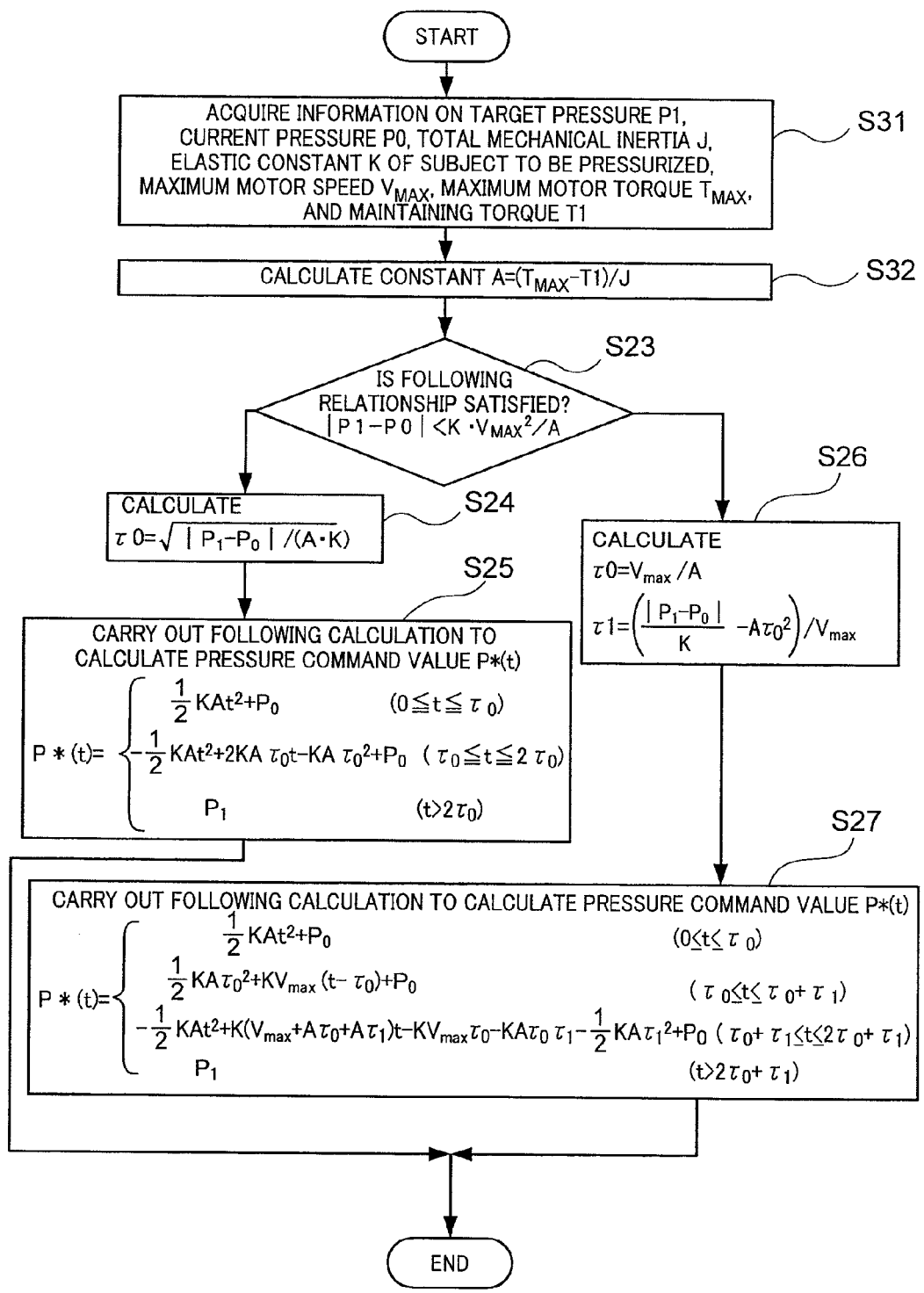

MOTOR CONTROL DEVICE

TECHNICAL FIELD

The present invention relates to a motor control device for controlling drive of a motor for pressing a mechanical load against a subject.

BACKGROUND ART

In various molding/forming machines such as an injection molding machine and a press-forming machine, and a machining device (machining machines) such as a bonding machine, an electrically-powered mechanism (mechanical driving unit) is driven by a motor, thereby applying a pressure on a pressurized target. Moreover, in those machining devices, generally, an actual pressure value, which is a pressure value when the mechanical load is pressed against a material to be molded/formed or the like or a workpiece, which is the pressurized target, is detected, and pressure control is performed based on the detected actual pressure value and a pressure command value. Based on this pressure control, a current command value for the motor is calculated so that the actual pressure value follows the pressure command value.

In this pressure control, as the pressure command signal, which is a signal of the pressure command value, a stepwise signal in which a pressure value considered as the target is a final value is often used. However, by the control applying the stepwise pressure command signal, an overshoot, which is a phenomenon in which the actual pressure value exceeds the target value, is generated. In the pressure control in the molding/forming machine and the bonding machine, the generation of the overshoot generates an actual pressure value excessively larger than the value of the target pressure, resulting in an adverse effect on a quality of molded/formed products and machined products.

In order to address this problem, for example, in a conventional apparatus described in Patent Literature 1, as the pressure command signal, a signal, which rises at an approximately linear rate and reaches a target pressure considered as a target, is used.

CITATION LIST

Patent Literature

[PTL 1] JP 2006-255743 A

SUMMARY OF INVENTION

Technical Problem

The conventional apparatus described in Patent Literature 1 does not have an index for specifically determining at what rate the pressure command value should be increased in an approximately linear manner, namely, an index for specifically determining the gradient of the line. Therefore, when the gradient is relatively small, the overshoot is not generated but the small gradient accordingly delays the time to reach the pressure considered as the target. This results in inconvenience such as an increase in time of a machine operation. On the other hand, when the gradient of the line is relatively large, there is a problem in that an overshoot is generated as in the case where the stepwise pressure command signal is applied.

It should be noted that this problem occurs in force control in addition to in the pressure control.

The present invention has been made in view of the above-mentioned problem, and therefore has an object to provide a motor control device which is capable of suppressing the generation of an overshoot, and improving a capability of a mechanical physical quantity, which acts from the mechanical load to the subject, to follow a physical quantity command value.

Solution to Problem

According to the present invention, there is provided a motor control device provided to an electrically-powered mechanism which includes a motor, is connected to a mechanical load for applying a mechanical physical quantity, which is any one of a force and a pressure, to a subject, and applies the mechanical physical quantity to the subject, by power of the motor, by displacing the mechanical load to press the mechanical load against the subject, the motor control device including a motor control device main unit for acquiring, as an acquired physical quantity value, a value of the mechanical physical quantity acting from the mechanical load to the subject, generating a physical quantity command value used to control the acquired physical quantity value to attain a physical quantity target value set in advance, and controlling drive of the motor by using the acquired physical quantity value and the physical quantity command value, in which the motor control device main unit is configured to: store, in advance, information on an elastic constant of the subject and information on a maximum speed of the motor; and generate the physical quantity command value so that a derivative of the physical quantity command value is equal to or less than a product of the elastic constant of the subject and the maximum speed of the motor.

Advantageous Effects of Invention

According to the motor control device of the present invention, the motor control device main unit generates the physical quantity command value so that the derivative of the physical quantity command value is equal to or less than the product of the elastic constant of the subject and the maximum speed of the motor, and hence the gradient of the change in the physical command value corresponds to the maximum speed of the motor. Accordingly, the generation of the overshoot can be suppressed, and the capability of the mechanical physical quantity, acting from the mechanical load to the subject, to follow the physical quantity command value can be improved.

BRIEF DESCRIPTION OF DRAWINGS

FIG. 1 A block diagram illustrating a motor control device according to a first embodiment of the present invention.

FIG. 2 A flowchart illustrating an operation of a pressure command signal generation module of FIG. 1.

FIG. 9 A flowchart illustrating an operation of a pressure command signal generation module of FIG. 8.

DESCRIPTION OF EMBODIMENTS

Figure 3:
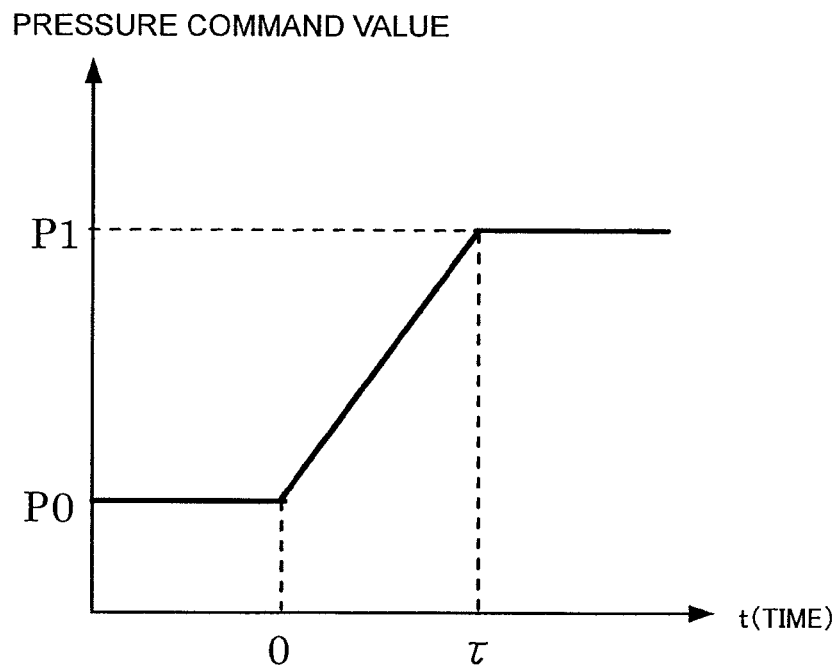
FIG. 3 A graph illustrating a change in a pressure command value calculated by the pressure command signal generation unit of FIG. 1.

A description is now given of embodiments of the present invention referring to the drawings.

First Embodiment

FIG. 1 is a block diagram illustrating a motor control device according to a first embodiment of the present invention.

In FIG. 1, a machining device 1 includes an electrically-powered mechanism 4 having a rotational motor (motor for pressing) 2 and an encoder 3, a mechanical load (pressing member) 5, and a pressure detector 6.

The encoder 3 is speed detection means for generating an actual motor speed signal corresponding to a rotation speed of the motor 2. The electrically-powered mechanism 4 is a feed screw mechanism which converts a rotational motion to a translational motion, and includes a screw 4a and a ball screw nut 4b. The screw 4a is rotated in its peripheral direction by the motor 2. The ball screw nut 4b is displaced in an axial direction of the screw 4a by the rotation of the screw 4a.

The mechanical load 5 is attached to the ball screw nut 4b. A distal end portion of the mechanical load 5 is opposed to a pressurized target (target) 7. Moreover, the mechanical load 5 is displaced in the axial direction of the screw 4a along with the ball screw nut 4b. The pressurized target 7 is pressurized by the mechanical load 5. The pressure detector 6 is attached to the mechanical load 5. Moreover, the pressure detector 6 is a load cell, a type of force sensor, or the like. Further, the pressure detector 6 generates an actual pressure signal 6a corresponding to a pressure (mechanical physical quantity) while the mechanical load 5 is pressurizing the pressurized target 7.

The drive of the motor 2 is controlled by a motor control device main unit 10. The motor control device main unit 10 includes a pressure command signal generation module 11, a pressure control module 12, a speed control module 13, and a current control module 14. The pressure command signal generation module 11 generates a signal of a pressure command value (physical quantity command value), which is a command value for a pressure applied to the pressurized target, namely a pressure command signal 11a.

The pressure control module 12 receives a signal 11b for a deviation (difference) between the pressure command value of the pressure command signal 11a from the pressure command signal generation unit 11, and the actual pressure value (acquired physical quantity value) of the actual pressure signal 6a from the pressure detector 6. Moreover, the pressure control module 12 carries out pressure control calculation to calculate a motor speed command value based on the deviation between the pressure command value and the actual pressure value, and generates a motor speed command signal 12a, which is a signal of the motor speed command value. One example of the pressure control calculation by the pressure control module 12 is proportional control in which the deviation between the pressure command value and the actual pressure value is multiplied by a proportional constant defined by a proportional gain parameter to output the speed command value.

The speed control module 13 receives a signal 12b for a deviation (difference) between the motor speed command value of the motor speed command signal 12a from the pressure control module 12 and the actual motor speed of the actual motor speed signal 3a from the encoder 3. Moreover, the speed control module 13 carries out speed control calculation to calculate a motor current command value based on a deviation between the motor speed command value and the actual motor speed, and generates a motor current command signal 13a, which is a signal of the motor current command value. One example of the speed control calculation by the speed control module 13 is proportional and integral control based on two parameters, which are a proportional gain parameter and an integral gain parameter.

The current control module 14 receives the motor current command signal 13a from the speed control module 13. Moreover, the current control module 14 feeds power 14a to the motor 2 based on the motor current command value of the motor current command signal 13a.

On this occasion, the motor control device main unit 10 can be constituted by a computer (not shown) including a calculation processing unit (CPU), a storage unit (ROM and RAM and the like), and a signal input/output unit. The storage unit of the computer of the motor control device main unit 10 stores programs for realizing functions of the pressure command signal generation module 11, the pressure control module 12, the speed control module 13, and the current control module 14.

A more specific description is now given of the calculation processing by the pressure command signal generation module 11. FIG. 2 is a flowchart illustrating the operation of the pressure command signal generation module 11 of FIG. 1. In FIG. 2, in Step S11, the pressure command signal generation module 11 acquires a target pressure P1 (physical quantity target value), which is a pressure to be applied, a current pressure P0, which is a pressure currently maintained, the maximum motor speed $V_{max}$, and the elastic constant K of the pressurized target 7.

On this occasion, regarding the target pressure P1, the maximum motor speed $V_{max}$, and the elastic constant K, values registered, in advance, to the pressure command signal generation module 11 can be used. Moreover, regarding the current pressure P0, the actual pressure value (namely, the actual pressure value acquired via the pressure detector 6) acquired from the actual pressure signal 6a of the pressure detector 6 by the pressure command signal generation module 11 can be used. Alternatively, an actual pressure value estimated and acquired by the pressure command signal generation module 11 can also be used.

Then, in Step S12, the pressure command signal generation module 11 calculates a pressurizing transition period τ based on the following equation.

$$\tau = |P1-P0|/(K \cdot V_{max})$$

Then, in Step S13, the pressure command signal generation module 11 calculates a pressure command value P*(t) based on the following equation (1).

[Math. 1]

$$P*(t) = \begin{cases} KV_{max}t + P_0 & \text{(case of } 0 \leq t \leq \tau, P_1 > P_0) \\ -KV_{max}t + P_0 & \text{(case of } 0 \leq t \leq \tau, P_1 \leq P_0) \\ P_1 & \text{(case of } t > \tau) \end{cases} \quad (1)$$

On this occasion, t is a parameter representing time, and a time point t=0 is a start time point of the change in the pressure command value P*(t) from the current pressure P0 to the target pressure P1.

FIG. 3 is a graph illustrating the change in the pressure command value P*(t) calculated by the pressure command signal generation module 11 of FIG. 1. In FIG. 3, the change in the pressure command value P*(t) from the current pressure P0 to the target pressure P1 starts at the time point t=0, and the pressure command value P*(t) reaches the target pressure P1 at a time point t=τ. On this occasion, by assigning t=τ to the equation (1), it is confirmed that the pressure command value P*(t) at t=τ coincides with the target pressure P1.

Then, a description is now given of an effect of the first embodiment, particularly an effect by the pressure command value calculated by the pressure command signal generation module 11. In general, when the mechanical load 5 is in contact with the pressurized target 7, as a travel quantity of the mechanical load 5 increases (in FIG. 1, as the mechanical load 5 travels toward right), a higher pressure is generated. A value for representing this characteristic is the elastic constant K of the pressurized target 7.

The elastic constant K is a proportional constant representing how much pressure is generated with respect to the motor position (rotation angle). In a case where the elastic constant K of the pressurized target 7 represents a linear characteristic, a relation represented by the following equation (2) is established:

$$P = K \cdot X + B \qquad (2)$$

where X denotes the motor position, P denotes the pressure, and B denotes a constant.

On this occasion, the control for changing the pressure generated on the pressurized target 7 corresponds to, focusing on the operation of the mechanical load 5 and the motor 2 driving the mechanical load 5, a travel of the position of the mechanical load 5 or the position of the motor from a certain position to another position.

A configuration of a conventional pressure control system applies a pressure command signal 11a which changes stepwise. However, in such a case where the pressure command signal 11a changing stepwise is used, unless the motor position changes stepwise as well, the change in the actual pressure value will not sufficiently follow the change in the pressure command value.

Moreover, in order to change the motor position stepwise, the actual motor speed signal 3a, which is a derivative of the motor position, and the speed command signal 12a serving as a reference signal for the speed control module 13 should be infinite in magnitude, and should take an impulse form.

As a result, when the pressure command signal 11a changing stepwise is applied, the actual pressure value tends to follow the pressure command value, and the pressure control module 12 generates a speed command signal which changes the motor position stepwise, namely, a speed command signal 12a which is infinite in magnitude of the speed command signal and takes an impulse form.

Moreover, without limiting to the configuration of the pressure control system in which a minor loop of the pressure control is the speed control (as illustrated in FIG. 1, the pressure control module 12 generates the speed command signal 12a), when control in which the pressure command value changes stepwise and the actual pressure value tends to follow the pressure command value is attempted, the motor speed tends to follow a motion which is infinite in magnitude and takes the impulse form. In general, there is the maximum motor speed for the motor 2, which is the maximum speed which the motor 2 can usually output, and an application of a speed command value higher than the maximum motor speed is thus not preferred in terms of the motor control.

If control is carried out while a speed command value larger than the maximum motor speed is applied, a overshoot and vibration are generated on the actual motor speed, and, as a result, unfavorable phenomena such as an overshoot and a vibration are also generated in the pressure applied to the pressurized target. Moreover, also in a case where the applied pressure command signal 11a is not stepwise but with a certain degree of gradient, if the gradient of the applied pressure command signal 11a is relatively large, the speed command signal 12a having the speed command value exceeding the maximum motor speed will be applied.

In contrast, according to the first embodiment, in a case where the pressure command value based on the processing illustrated in FIG. 2 is applied, in the time range 0≤t≤τ in which the pressure command value changes, the value $V_{max}$ is acquired by dividing the pressure command value P*(t) by the elastic constant K of the pressurized target 7, and then differentiating the quotient. In other words, the derivative of the pressure command value is a product of the elastic constant and the maximum motor speed. The value acquired by dividing the pressure command value of the pressure command signal 11a serving as the reference signal for the pressure control module 12 by the elastic constant K is the value representing the motor position while the pressure control is being carried out, from the equation (2). Moreover, the derivative of this value corresponds to the value representing the motor speed while the pressure control is being carried out.

According to this fact, in the first embodiment, while the pressure control for changing the current pressure to the target pressure is being carried out, the speed of the motor 2 is equal to or less than the maximum motor speed, and hence unfavorable phenomena such as an overshoot and a vibration which are generated when a stepwise pressure command signal or a pressure command signal having a relatively large gradient is applied can be prevented from being generated, resulting in a stable pressure and force control.

As described above, according to the first embodiment, the pressure command signal generation module 11 of the motor control device main unit 10 generates the pressure command value so that the derivative of the pressure command value is equal to or less than the product of the elastic constant K of the pressurized target and the maximum motor speed $V_{max}$. This configuration controls the gradient of the change in the pressure command value to be a gradient corresponding to the maximum motor speed $V_{max}$, and hence the generation of the overshoot can be restrained, and the capability of the actual pressure value to follow the command pressure value can be improved.

Moreover, according to the first embodiment, a quantitative guideline can be provided with respect to the gradient of the change in the pressure command value when the pressure command value is changed, resulting in more appropriate setting of the gradient of the change in the pressure command value.

On this occasion, in Step S1 of the flowchart in FIG. 2 according to the first embodiment, the pressure command value P*(t) is calculated by using the maximum motor speed $V_{max}$. However, the calculation of the pressure command value P*(t) is not limited to this example, and, in place of the maximum motor speed $V_{max}$, an arbitrary value Vn less than the maximum motor speed $V_{max}$ may be used. In this case, the value, which is acquired by dividing the pressure command value by the elastic constant K of the pressurized target and differentiating the quotient, is equal to or less than the value Vn, resulting in the same effect as in the first embodiment.

According to the method of calculating the pressure command value P*(t) by using the maximum motor speed $V_{max}$ as in the first embodiment, the pressure control of changing the current pressure P0 to the target pressure P1 corresponds to pressure control of operating the motor 2 at the maximum speed within a possible range of the output of the motor 2, resulting in an effect of realizing pressure control of quickly attaining the target pressure P1.

Second Embodiment

In the first embodiment, the configuration focusing on the maximum speed of the motor 2 is described. In contrast, according to a second embodiment, a configuration focusing on, in addition to the maximum speed of the motor 2, a maximum torque of the motor 2 is described.

In general, for the motor 2, there is not only the maximum speed which can be output but also the maximum torque which can be output. During the pressure control, when an attempt is made to output a torque larger than the maximum torque which the motor 2 can output, unfavorable phenomena such as an overshoot and a vibration are generated in the pressure applied to the pressurized target 7. For example, when a stepwise target pressure is applied as the pressure command signal 11a, those phenomena are generated.

In contrast, according to the second embodiment, in order to prevent those phenomena from being generated, a configuration for, during the pressure control, calculating the pressure control value enabling not only the motor speed to be equal to or less than the maximum motor speed, but also enabling the motor torque to be equal to or less than the maximum motor torque is described.

Figure 4:
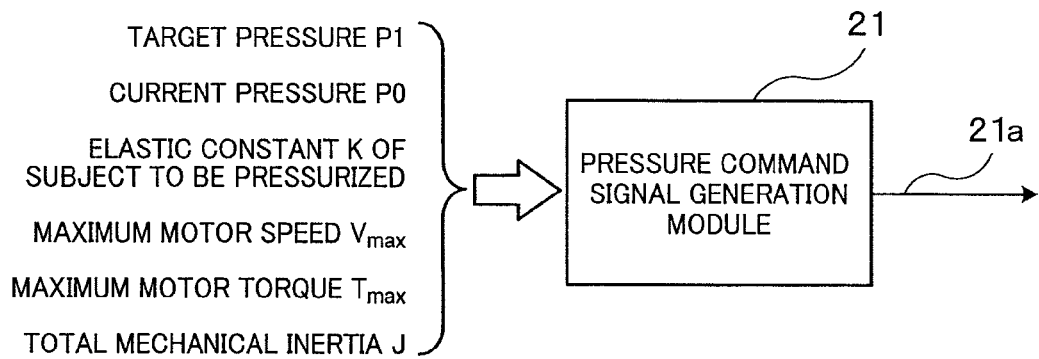
FIG. 4 A block diagram illustrating a part of a motor control device according to a second embodiment of the present invention.

The configuration of the second embodiment is the same as that of the first embodiment except for a pressure command signal generation module 21. FIG. 4 is a block diagram illustrating a part of the motor control device according to the second embodiment of the present invention. In FIG. 4, in addition to the information on the elastic constant K of the pressurized target, the target pressure P1, and the maximum motor speed $V_{max}$, the pressure command signal generation module 21 according to the second embodiment stores, in advance, information on the maximum motor torque $T_{max}$ and the total mechanical inertia J. Based on those pieces of information and the current pressure P0, the pressure command signal generation module 21 calculates the pressure command value, thereby generating a pressure command signal 21a, which is a signal of the pressure command value.

It should be noted that, regarding the current pressure P0, as in the first embodiment, the actual pressure value acquired by the pressure command signal generation module 21 from the actual pressure signal 6a of the pressure detector 6, or a value acquired by the pressure command signal generation module 21 estimating the actual pressure can be used.

On this occasion, the total mechanical inertia J is an inertia of portions which are moved by the drive of the motor 2, and corresponds to an inertia acquired by summing, in FIG. 1, an inertia of the motor 2, an inertia of the electrically-powered mechanism 4, an inertia of the mechanical load 5, and an inertia of the pressure detector 6.

Figure 5:
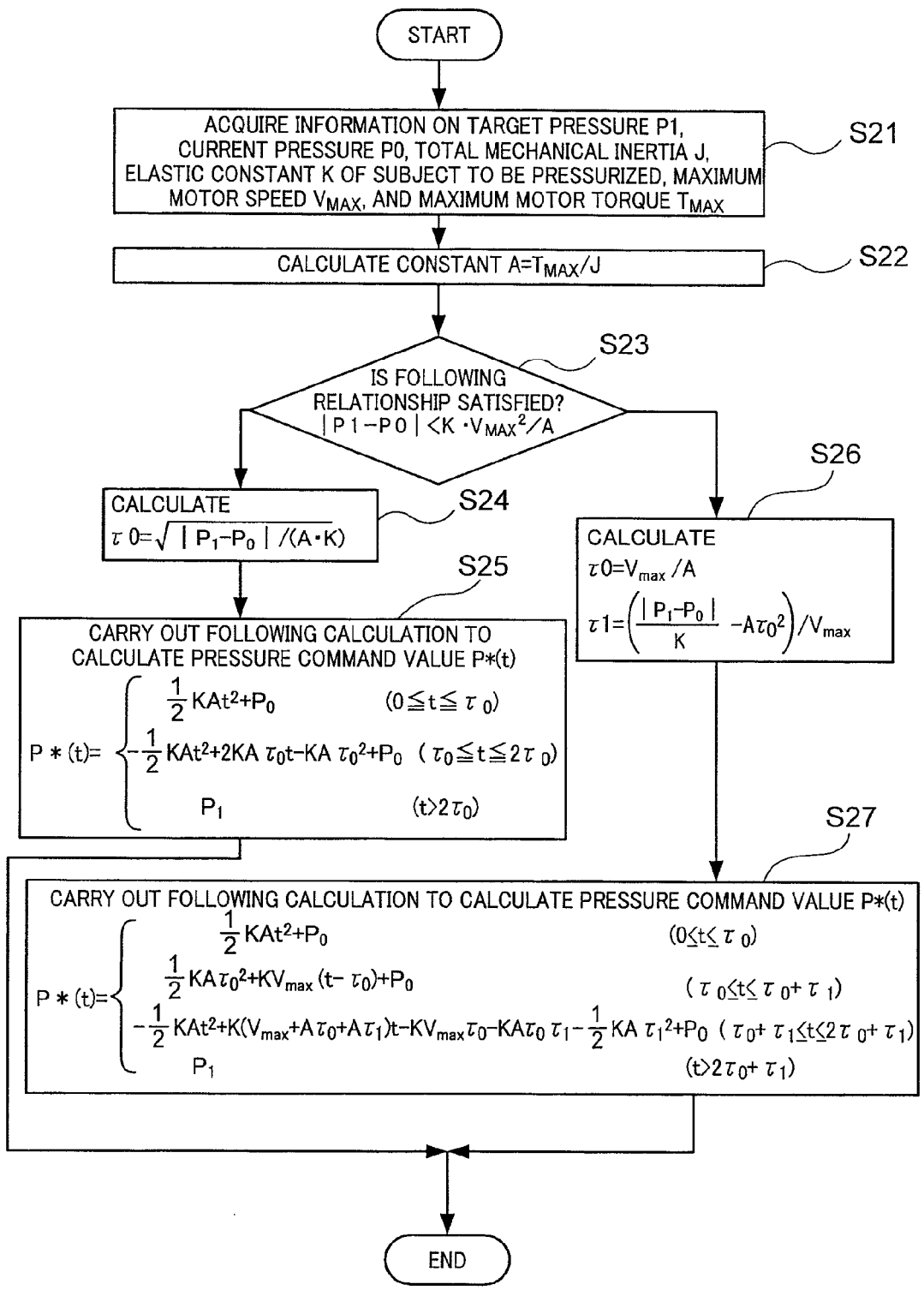
FIG. 5 A flowchart illustrating an operation of a pressure command signal generation module of FIG. 4.

A more specific description is now given of the calculation processing by the pressure command signal generation module 21. FIG. 5 is a flowchart illustrating the operation of the pressure command signal generation module 21 of FIG. 4. In FIG. 5, in Step S21, the pressure command signal generation module 21 acquires, as information for generating the pressure command, a target pressure P1, a current pressure P0, the maximum motor speed $V_{max}$, the maximum motor torque $T_{max}$, the total mechanical inertia J, and the elastic constant K of the pressurized target 7.

In Step S22, the pressure command signal generation module 21 calculates a constant $A=T_{max}/J$. On this occasion, the constant A is a constant corresponding to an acceleration which can be output when the motor 2 drives the machine having the inertia J at the maximum motor torque.

Then, in Step S23, based on the current pressure P0, the target pressure P1, the elastic constant K of the pressurized target 7, and the maximum motor speed $V_{max}$, the pressure command signal generation module 21 determines whether or not the following equation (3) is established.

$$|P1-P0| < K \cdot V_{max}^2 / A \tag{3}$$

"$V_{max}^2$" in the equation (3) represents the square of $V_{max}$.

On this occasion, when it is determined that the equation (3) is established, the pressure command signal generation module 21 successively carries out processing of Steps S24 and S25. On the other hand, when it is determined that the equation (3) is not established, the pressure command signal generation module 21 successively carries out processing of Steps S26 and S27.

Then, in Step S24, the pressure command signal generation module 21 calculates a constant τ0 according to the following equation (4).

[Math. 2]

$$\tau_0 = \sqrt{|P_1 - P_0|/(A \cdot K)} \tag{4}$$

A description is now given of a case of P1>P0. In Step S25, the pressure command signal generation module 21 calculates the pressure command value P*(t) by using the constant τ0, the parameter t, and the following equation (5).

[Math. 3]

$$P*(t) = \begin{cases} \dfrac{1}{2}KAt^2 + P_0 & (0 \le t \le \tau_0) \\ -\dfrac{1}{2}KAt^2 + 2KA\tau_0 t - KA\tau_0^2 + P_0 & (\tau_0 \le t \le 2\tau_0) \\ P_1 & (t > 2\tau_0) \end{cases} \tag{5}$$

Moreover, when it is determined in Step S23 that the equation (3) is not established, the pressure command signal generation module 21 calculates the constants τ0 and τ1 by using the following equation (6) in Step S26.

[Math. 4]

$$\tau_0 = V_{max}/A \tag{6}$$
$$\tau_1 = \left(\frac{|P_1 - P_0|}{K} - A\tau_0^2\right)/V_{max}$$

Then, in Step S27, the pressure command signal generation module 21 calculates the pressure command value P*(t) by using the parameter t and the following equation (7).

[Math. 5]

$$P*(t) = \begin{cases} \frac{1}{2}KAt^2 + P_0 & (0 \le t \le \tau_0) \\ \frac{1}{2}KA\tau_0^2 + KV_{max}(t - \tau_0) + P_0 & (\tau_0 \le t \le \tau_0 + \tau_1) \\ -\frac{1}{2}KAt^2 + K(V_{max} + A\tau_0 + A\tau_1)t - KV_{max}\tau_0 - KA\tau_0\tau_1\frac{1}{2}KA\tau_1^2 + P_0 & (\tau_0 + \tau_1 \le t \le 2\tau_0 + \tau_1) \\ P_1 & (t > 2\tau_0 + \tau_1) \end{cases} \quad (7)$$

The description has been given of the case of P1>P0, but in the case of P0>P1, in equations representing the pressure command value P*(t) in the equations (5) and (7), the calculation can be carried out similarly by inverting signs of terms other than P0 and P1.

A description is now given of a fact that, by using the pressure command value P*(t) according to the second embodiment, the speed of the motor 2 does not exceed the maximum motor speed $V_{max}$ while the pressure control is being carried out.

The value, which is acquired by dividing the pressure command value P*(t) by the elastic constant K and differentiating the quotient, corresponds to, as described in the first embodiment, the speed command value while the actual pressure value follows the pressure command value, and is represented by the following equation (8) in the case of Step S25.

[Math. 6]

$$\frac{1}{K} \cdot \frac{d}{dt}P*(t) = \begin{cases} At & (0 \le t \le \tau_0) \\ A(2\tau_0 - t) & (\tau_0 \le t \le 2\tau_0) \\ 0 & (\text{otherwise}) \end{cases} \quad (8)$$

On this occasion, for 0≤t≤τ0, "At" takes the maximum value when t=τ0, and hence the following relation is established.

[Math. 7]

$$At \le A\tau_0 = \sqrt{\frac{A}{K}|P_1 - P_0|} < \sqrt{\frac{A}{K} \cdot \frac{K}{A}V_{max}^2} = V_{max}$$

A second inequality in this equation is based on the condition that the condition in Step S23 is established.

Similarly, for τ0≤t≤2τ0, A(2τ0−t) takes the maximum value when t=τ0, and hence the following relation is established.

[Math. 8]

$$-At + 2A\tau_0 \le A\tau_0 = \sqrt{\frac{A}{K}|P_1 - P_0|} < \sqrt{\frac{A}{K} \cdot \frac{K}{A}V_{max}^2} = V_{max}$$

Considering those relations, in any one of the cases, it is understood that the motor speed does not exceed $V_{max}$, which is the maximum speed of the motor. Similarly, when the pressure command value P*(t) is calculated in the case of Step S27, the value, which is acquired by dividing the pressure command value P*(t) by K and differentiating the quotient, is represented by the following equation (9).

[Math. 9]

$$\frac{1}{K} \cdot \frac{d}{dt}P*(t) = \begin{cases} At & (0 \le t \le \tau_0) \\ V_{max} & (\tau_0 \le t \le \tau_0 + \tau_1) \\ V_{max} + A(\tau_0 + \tau_1 - t) & (\tau_0 + \tau_1 \le t \le 2\tau_0 + \tau_1) \\ 0 & (\text{otherwise}) \end{cases} \quad (9)$$

Therefore, it is understood that the maximum value of the equation (9) is equal to or less than $V_{max}$. As described above, in any one of the cases of Steps S25 and S27, during the pressure control of changing the pressure from the current pressure P0 to the target pressure P1, the motor speed is equal to or less than the maximum motor speed $V_{max}$.

A description is now given of a fact that, by using the pressure command value P*(t) according to the second embodiment, the torque of the motor 2 does not exceed the maximum motor torque $T_{max}$ while the pressure control is being carried out. When the pressure command value P*(t) is generated in Step S25, a value, which is acquired by dividing the second derivative of the pressure command value P*(t) by the elastic constant K and multiplying the quotient by the total mechanical inertia J, is represented by the following equation (10).

[Math. 10]

$$\frac{J}{K} \cdot \frac{d^2}{dt^2}P*(t) = \begin{cases} AJ & (0 \le t \le \tau_0) \\ -AJ & (\tau_0 \le t \le 2\tau_0) \\ 0 & (\text{otherwise}) \end{cases} \quad (10)$$

Moreover, when the pressure command value P*(t) is generated in Step S27, a value, which is acquired by dividing the second derivative of the pressure command value P*(t) by the elastic constant K and multiplying the quotient by the total mechanical inertia J, is represented by the following equation (11).

[Math. 11]

$$\frac{J}{K} \cdot \frac{d^2}{dt^2}P*(t) = \begin{cases} AJ & (0 \le t \le \tau_0) \\ 0 & (\tau_0 \le t \le \tau_0 + \tau_1) \\ -AJ & (\tau_0 + \tau_1 \le t \le 2\tau_0 + \tau_1) \\ 0 & (\text{otherwise}) \end{cases} \quad (11)$$

In this way, in any one of the cases of Steps S25 and S27, the result of the calculation is A·J at most. On this occasion, the constant A is A=$T_{max}$/J, thus A·J=$T_{max}$, and, therefore, it is understood that the value, which is acquired by dividing the second derivative of the pressure command value by the elastic constant K and multiplying the quotient by the total mechanical inertia J, is equal to or less than the maximum motor torque $T_{max}$.

A description is now given of effects of the second embodiment. As described in the first embodiment, when the stepwise pressure command signal 21a is applied, unless the motor speed presents a change in a form of impulse, the pressure following the command is not realized. Further, a motor acceleration, which is a value acquired by differentiation once again, presents a form of impulse having an infinite magnitude. On this occasion, a value acquired by multiplying the motor acceleration by the total mechanical inertia J corresponds to the torque of the motor 2, and, thus, in order to follow the pressure command signal 21a having a form of impulse, a torque infinite in magnitude is necessary.

Moreover, even if a pressure command signal 21a not in a form of a step but in a form of a slope is generated, though the first derivative of the pressure command value is equal to or less than a predetermined value, it is not guaranteed that the second derivative of the pressure command value is equal to or less than the predetermined value. Therefore, an attempt of driving the motor 2 by generating a torque equal to or larger than the maximum motor torque $T_{max}$ may be made. Accordingly, an overshoot and a vibration may be generated in the torque, and, as a result, unfavorable phenomena such as the overshoot and the vibration may occur in the pressure applied to the pressurized target 7 as well.

Further, as described in the first embodiment, the value acquired by dividing the derivative of the pressure command value P*(t) by the elastic constant K corresponds to the motor speed when the pressure command value is perfectly followed. Thus, the value acquired by dividing the second derivative of the pressure command value P*(t) by the elastic constant K corresponds to the acceleration of the motor 2 when the pressure command value is perfectly followed. Moreover, the value, which is acquired by dividing the second derivative of the pressure command value P*(t) by the elastic constant K and multiplying the quotient by the total mechanical inertia J, corresponds to the torque required for the acceleration/deceleration operation of the motor 2 during the pressure control from the current pressure P0 to the target pressure P1.

In this way, according to the second embodiment, the pressure command value P*(t) is calculated so that the value, which is acquired by dividing the second derivative of the pressure command value P*(t) by the elastic constant K and multiplying the quotient by the total mechanical inertia J, is equal to or less than the maximum motor torque $T_{max}$. According to this configuration, the motor torque during the pressure control is equal to or less than the maximum motor torque $T_{max}$, resulting in an effect of preventing the unfavorable phenomena which occur in the case where the stepwise pressure command signal 21a is applied.

Figure 6:
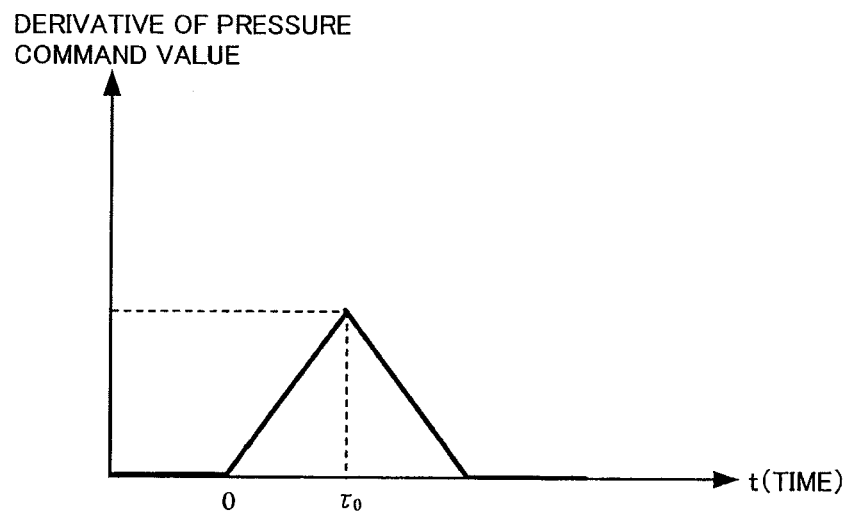
FIG. 6 A graph used for describing a change in a derivative of a pressure command value.

On this occasion, FIG. 6 is a change pattern (rough shape of the differentiated signal), which is drawn based on the equation (8), of the derivative of the pressure command value P*(t) generated according to the flowchart of FIG. 5. As illustrated in FIG. 6, the gradient of the derivative is A·K, and an entire change pattern is a triangle (isosceles triangle).

As described above, the value acquired by dividing the derivative of the pressure command value P*(T) by the elastic constant K corresponds to the motor speed during the pressure control. In other words, the fact that the overall change pattern of the derivative of the pressure command value takes the triangular shape means, from the view point of the motor 2, that the motor 2 is operated, in a state of the Bang-Bang control in which the motor linearly accelerates and linearly decelerates at a torque equal to or less than the maximum motor torque $T_{max}$ acquired in Step S21 of FIG. 5, to increase or decrease the pressure as fast as possible.

Figure 7:
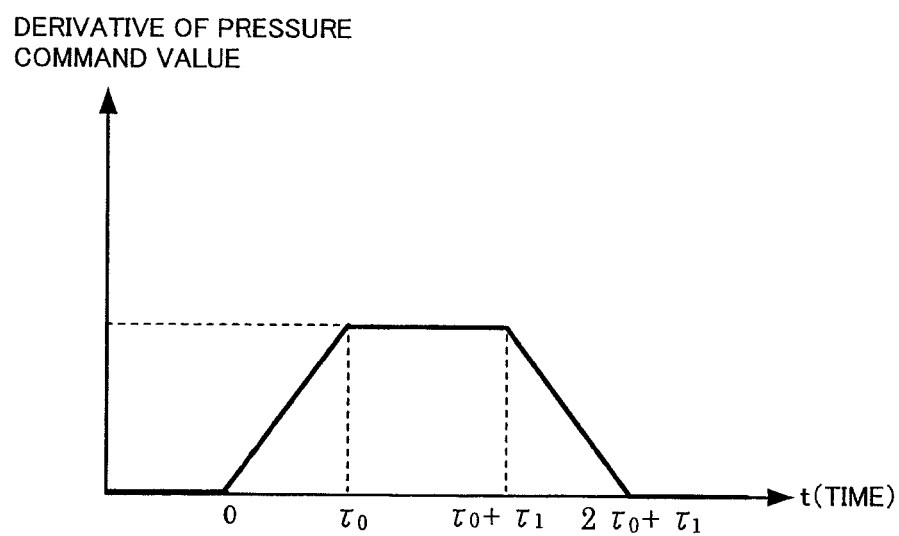
FIG. 7 A graph used for describing a change in a derivative of the pressure command value.

In the same manner, FIG. 7 is a change pattern (rough shape of the differentiated signal), which is drawn based on the equation (9), of the derivative of the pressure command value P*(t) generated according to the flowchart of FIG. 5. As illustrated in FIG. 7, an entire change pattern of the derivative takes a trapezoidal shape. The fact that the overall change pattern of the derivative of the pressure command value P*(t) takes the trapezoidal shape means, from the view point of the motor 2, that the motor 2 linearly accelerates at a torque equal to or less than the maximum motor torque $T_{max}$ acquired in Step S21 of FIG. 5, maintains a speed equal to or less than the maximum motor speed $V_{max}$ after the end of the acceleration, and finally linearly decelerates at a torque equal to or less than the maximum motor torque $T_{max}$.

Also in this case, in a state of the Bang-Bang control, the motor is operated to increase or decrease the pressure. In other words, while the phenomena, in which the motor speed exceeds the maximum motor speed or the motor torque exceeds the maximum motor torque during the pressure control, which causes unfavorable phenomena such as an overshoot of the pressure and a vibration is being prevented, the control of increasing or decreasing the pressure applied to the pressurized target as fast as possible can be carried out by maximally using the performance of the motor 2.

It should be noted that, according to the second embodiment, in Step S21 of FIG. 5, the maximum motor torque $T_{max}$ is used for a series of processing. However, the control is not limited to this example, and, in place of the maximum motor torque $T_{max}$, an arbitrary value Tn less than the maximum motor torque $T_{max}$ may be used. On this occasion, by using Tn in place of $T_{max}$, it can be shown that the second derivative of the pressure command value P*(t) is devided by the elastic constant K, and that the total mechanical inertia J is equal to or less than Tn, and hence the motor torque during the pressure control is equal to or less than Tn.

Moreover, independently of the flowchart of FIG. 5, as long as the value, which is acquired by dividing the second derivative of the pressure command value by the elastic constant K and multiplying the quotient by the total mechanical inertia J, is equal to or less than the maximum motor torque, the motor torque during the pressure control can be made equal to or less than the maximum motor torque.

Third Embodiment

In the pressure control, merely maintaining a constant pressure applied to the pressurized target without changing the pressure applied to the pressurized target 7 requires the motor 2 to generate a torque for the maintenance. Specifically, when a pressure/force is applied to the pressurized target 7, a pressure/force opposite in direction and the same in magnitude is also applied to the mechanical load 5 due to the principle of action and reaction. In order to oppose the pressure/force generated as the reaction, it is necessary to control the motor 2 to generate a torque corresponding to the pressure/force of the reaction, thereby maintaining the pressure applied to the pressurized target 7. Particularly, when the pressure/force to be controlled is relatively large, it is necessary to carry out the control in consideration of this maintaining torque. In a third embodiment of the present invention, a description is given of a configuration which takes this maintaining torque into consideration.

First, a description is given of a method of acquiring the maintaining torque. As illustrated in FIG. 1, when the rotational motion is converted into the translational motion by directly coupling the feed screw mechanism to the motor, a maintaining torque Tp for maintaining a force P can be calculated by Tp=P×L/(2π) where L is a lead of the feed screw mechanism (ball screw). This is an equation acquired from a calculation formula P=2π/L×T used to calculate a force F generated on the ball screw nut when a torque T is generated on the motor 2.

Moreover, in a case where the motor and the feed screw mechanism are not directly coupled to each other, and, after a speed change via a speed change mechanism such as a speed reduction machine or a timing belt, the feed screw mechanism is coupled to the motor, the maintaining torque Tp can be calculated by Tp=N×P×L/(2π) where N is the speed change ratio (gear ratio) (the motor speed is increased by N times via the speed change mechanism).

Figure 8:
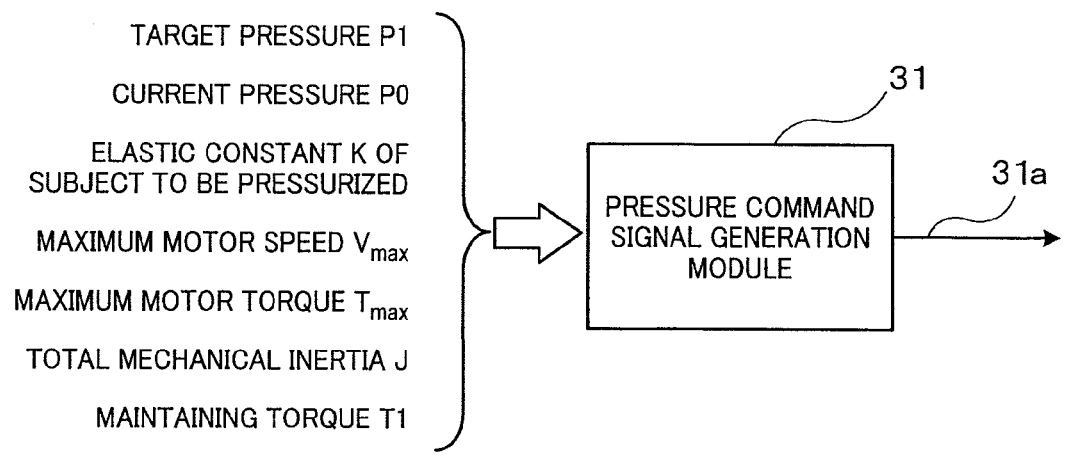
FIG. 8 A block diagram illustrating a part of a motor control device according to a third embodiment of the present invention.

A description is now given of a configuration of the third embodiment. The configuration of the third embodiment is the same as that of the first embodiment except for a pressure command signal generation module 31. FIG. 8 is a block diagram illustrating a part of the motor control device according to the third embodiment of the present invention. In FIG. 8, in addition to the information on the elastic constant K of the pressurized target, the target pressure P1, the maximum motor speed $V_{max}$, the maximum motor torque $T_{max}$, and the total mechanical inertia J, the pressure command signal generation module 31 stores, in advance, information on the maintaining torque T1 for maintaining the pressure applied to the pressurized target 7. Moreover, based on those pieces of information, and on the current pressure P0 acquired from the actual pressure signal 6a from the pressure detector 6 or acquired by means of estimation, the pressure command signal generation module 21 calculates the pressure command value, thereby generating a pressure command signal 31a, which is a signal of the pressure command value.

A specific description is now given of the calculation processing by the pressure command signal generation module 31. FIG. 9 is a flowchart illustrating the operation of the pressure command signal generation module 31 of FIG. 8. Processing (in Steps S23 to S27) other than processing in Steps S31 and S32 of FIG. 9 is the same as that of the second embodiment, and a description is mainly given of a difference from the second embodiment.

In FIG. 9, in Step S31, the pressure command signal generation module 31 acquires, as information for generating the pressure command, the target pressure P1, the current pressure P0, the maximum motor speed $V_{max}$, the maximum motor torque $T_{max}$, the total mechanical inertia J, and the maintaining torque T1.

On this occasion, as an example of the maintaining torque T1, in a case where the lead of the feed screw mechanism serving as the electrically-powered mechanism 4 is L, a method of calculating T1 as T1=P1×L/(2π) when P1>P0, and calculating T1 as T1=P0×L/(2π) when P0>P1, namely, calculating the maintaining torque from a larger pressure out of the current pressure P0 and the target pressure P1, and the like can be employed.

Then, in Step S32, the pressure command signal generation module 31 calculates the constant A=($T_{max}$−T1)/J. The constant A represents the maximum acceleration of the motor 2 when the mechanical load is driven by a torque acquired by subtracting the maintaining torque from the maximum torque. Processing subsequent thereto is the same as that of the second embodiment.

A description is now given of effects of the third embodiment. First, the processing of Step S23 of FIG. 9 and subsequent thereto is the same as that of the second embodiment, and hence the effect obtained from the second embodiment, namely the effect that the motor speed is equal to or less than the maximum motor speed during the pressure control is also obtained from the third embodiment.

Moreover, according to the third embodiment, the processing in Step S32 of FIG. 9 corresponds to processing in which $T_{max}$−T1 is used as the torque Tn equal to or less than the maximum torque in Step S22 of FIG. 5 according to the second embodiment. Therefore, also in the third embodiment, the torque required for the acceleration/deceleration operation of the motor 2 in the pressure control from the current pressure P0 to the target pressure P1 is equal to or less than Tn. When the maintaining torque T1 for maintaining the current pressure P0 or the target pressure P1 is so large that the maintaining torque T1 is not negligible, a sum of the torque Tn required for the acceleration/deceleration operation of the motor 2 and the maintaining torque T1 (namely the following calculation formula) does not exceed the maximum motor torque $T_{max}$.

$$Tn+T1=(T_{max}-T1)+T1=T_{max}$$

Therefore, unfavorable phenomena such as an overshoot of the pressure and a vibration generated by applying a torque command larger than the maximum motor torque $T_{max}$ can be prevented.

It should be noted that the description has been given of the configurations relating to the pressure control in the first to third embodiments, but the pressure control according to the first to third embodiments may be directly replaced by the force control. Namely, as the mechanical physical quantity, the force can be used.

Moreover, in the first to third embodiments, the description is given of the examples of the pressure control in which a motor of rotational type is used, and, by converting the rotational motion to the translational motion, the pressurized target is pressurized by the mechanical load. However, also in a case where a linear motor is used in place of the motor of rotational type, the present invention can be applied. In this case, in the second and third embodiments, by replacing the total mechanical inertia by the total mass of the motor 2, the electrically-powered mechanism 4, and the mechanical load 5, and by replacing the maximum motor torque by the maximum motor thrust, the same processing as in the second and third embodiments can be applied. Further, in the third embodiment, when the pressure control is carried out by driving the mechanical load not through the use of the feed screw but through the use of a linear motor, a generated force (thrust) directly serves as a maintaining thrust.

Moreover, in the first to third embodiments, the pressure detector 6 is used, but the pressure detector 6 may be omitted. In this case, the pressure may be estimated from information on the current and the speed of the motor, and the pressure may be controlled based on the estimated value.

Further, in FIG. 1 according to the first embodiment, the configuration example in which the minor loop of the pressure control is the speed control loop (the output of the control module 12 is the motor speed command) is illustrated. However, it is also possible to employ a configuration of the control system in which, as the minor loop, a position control loop or a current control loop is used, a configuration of the control system in which a control system design method based on the modern control theory is used, or a configuration of the control system in which the feed forward control is simultaneously used.

The invention claimed is:

1. A motor control device provided to an electrically-powered mechanism which includes a motor, is connected to a mechanical load for applying a mechanical physical quantity, which is any one of a force and a pressure, to a subject, and applies the mechanical physical quantity to the subject, by power of the motor, by displacing the mechanical load to press the mechanical load against the subject, the motor control device comprising a motor control device main unit for acquiring, as an acquired physical quantity value, a value of the mechanical physical quantity acting from the mechanical load to the subject due to the mechanical load being displaced to press the mechanical load against the subject, generating a physical quantity command value used to control the acquired physical quantity value to attain a physical quantity target value set in advance, and controlling drive of the motor by using the acquired physical quantity value and the physical quantity command value, wherein the motor control device main unit comprises:
means for storing, in advance, information on an elastic constant of the subject and information on a maximum speed of the motor; and
means for generating the physical quantity command value so that a derivative of the physical quantity command value is equal to or less than a product of the elastic constant of the subject and the maximum speed of the motor.

2. A motor control device provided to an electrically-powered mechanism which includes a motor, is connected to a mechanical load for applying a mechanical physical quantity, which is any one of a force and a pressure, to a subject, and applies the mechanical physical quantity to the subject, by power of the motor, by displacing the mechanical load to press the mechanical load against the subject, the motor control device comprising a motor control device main unit for acquiring, as an acquired physical quantity value, a value of the mechanical physical quantity acting from the mechanical load to the subject due to the mechanical load being displaced to press the mechanical load against the subject, generating a physical quantity command value used to control the acquired physical quantity value to attain a physical quantity target value set in advance, and controlling drive of the motor by using the acquired physical quantity value and the physical quantity command value, wherein the motor control device main unit comprises:
means for storing, in advance, information on an elastic constant of the subject, information on a maximum speed of the motor, information on any one of a maximum torque and a maximum thrust of the motor, and information on any one of a total mechanical inertia and a total mechanical mass of the electrically-powered mechanism; and
means for generating the physical quantity command value so that a value, which is acquired by dividing a second derivative of the physical quantity command value by the elastic constant of the subject and multiplying a quotient of the division by the total mechanical inertia or the total mechanical mass, is equal to or less than the maximum torque or the maximum motor thrust.

3. A motor control device provided to an electrically-powered mechanism which includes a motor, is connected to a mechanical load for applying a mechanical physical quantity, which is any one of a force and a pressure, to a subject, and applies the mechanical physical quantity to the subject, by power of the motor, by displacing the mechanical load to press the mechanical load against the subject, the motor control device comprising a motor control device main unit for acquiring, as an acquired physical quantity value, a value of the mechanical physical quantity acting from the mechanical load to the subject due to the mechanical load being displaced to press the mechanical load against the subject, generating a physical quantity command value used to control the acquired physical quantity value to attain a physical quantity target value set in advance, and controlling drive of the motor by using the acquired physical quantity value and the physical quantity command value, wherein the motor control device main unit comprises:
means for storing, in advance, information on an elastic constant of the subject, information on a maximum speed of the motor, information on any one of a maximum torque and a maximum thrust of the motor, information on any one of a total mechanical inertia and a total mechanical mass of the electrically-powered mechanism, and information on at least one of a maintaining torque and a maintaining thrust of the motor for maintaining the mechanical physical quantity acting from the mechanical load to the subject constant; and
means for generating the physical quantity command value so that a value, which is acquired by dividing a second derivative of the physical quantity command value by the elastic constant of the subject and multiplying a quotient of the division by the total mechanical inertia or the total mechanical mass, is equal to or less than a difference between the maximum torque and the maintaining torque, or is equal to or less than a difference between the maximum thrust and the maintaining thrust.

4. A motor control device according to claim 2, wherein the motor control device main unit generates the physical quantity command value so that a change pattern of a derivative of the physical quantity command value is triangular or trapezoidal.

5. A motor control device according to claim 3, wherein the motor control device main unit generates the physical quantity command value so that a change pattern of a derivative of the physical quantity command value is triangular or trapezoidal.

* * * * *